(12) United States Patent
Cross (10) Patent No.: US 10,042,154 B1
(45) Date of Patent: Aug. 7, 2018

(54) SYSTEM AND METHOD FOR INTRODUCING DISPLAY IMAGE INTO AFOCAL OPTICS DEVICE

(71) Applicant: BUSHNELL, INC., Overland Park, KS (US)

(72) Inventor: John W. Cross, Overland Park, KS (US)

(73) Assignee: BUSHNELL INC., Overland Park, KS (US)

( * ) Notice: Subject to any disclaimer, the term of this patent is extended or adjusted under 35 U.S.C. 154(b) by 0 days.

(21) Appl. No.: 15/425,499

(22) Filed: Feb. 6, 2017

(51) Int. Cl.
    *G02B 23/10* (2006.01)
    *F41G 1/38* (2006.01)
    *F41G 3/08* (2006.01)

(52) U.S. Cl.
    CPC ............... *G02B 23/10* (2013.01); *F41G 1/38* (2013.01); *F41G 3/08* (2013.01)

(58) Field of Classification Search
    CPC .............. G02B 23/10; F41G 1/38; F41G 3/08
    See application file for complete search history.

(56) References Cited

U.S. PATENT DOCUMENTS

| | | | | |
|---|---|---|---|---|
| 4,248,496 A | | 2/1981 | Akin, Jr. et al. | |
| 4,749,271 A | * | 6/1988 | Nagler ................... | G02B 23/10 356/251 |
| 5,272,514 A | * | 12/1993 | Dor ....................... | G02B 23/125 356/251 |
| 5,528,418 A | * | 6/1996 | Bowman, Jr. .......... | G02B 23/04 250/214 VT |
| 6,498,902 B2 | * | 12/2002 | Kanai .................... | G02B 23/10 396/296 |
| 7,443,494 B1 | * | 10/2008 | Kuerbitz ............... | G01S 17/026 356/139.04 |
| 8,363,321 B1 | * | 1/2013 | Pochapsky ............. | G02B 5/06 359/554 |
| 8,578,646 B2 | * | 11/2013 | Joannes .................. | F41G 1/48 42/113 |
| 8,705,173 B2 | | 4/2014 | Peters et al. | |
| 9,121,671 B2 | * | 9/2015 | Everett .................... | F41G 1/30 |
| 9,323,061 B2 | * | 4/2016 | Edwards ................ | G02B 23/10 |
| 9,335,124 B2 | * | 5/2016 | Maryfield ............... | F41G 1/30 |
| 9,389,425 B2 | | 7/2016 | Edwards et al. | |
| 9,435,610 B2 | | 9/2016 | Silvers et al. | |
| 2005/0219690 A1 | | 10/2005 | Lin et al. | |

(Continued)

*Primary Examiner* — Stephen Johnson
*Assistant Examiner* — Joshua T Semick
(74) *Attorney, Agent, or Firm* — Seyfart Shaw LLP; Brian Michaelis (57) ABSTRACT

A system and method for introducing a display image into an afocal optics device through an objective lens and without using a beamsplitter. A display device emits the image in a first direction, a focusing lens focuses the image, and a first reflector redirects the image in a second direction. A second reflector redirects the image through a periphery of the lens so that both the image and gathered light received from a target appears on the same focal plane such that the image appears to a user to be located between the lens and the target. The periphery of the objective lens may be a distance which is no more than 30% of a diameter of the lens from an edge of the lens. If the optics device is a rifle scope, the image may communicate such relevant information as range, inclination, wind direction or velocity, or temperature.

16 Claims, 5 Drawing Sheets

(56) References Cited

U.S. PATENT DOCUMENTS

| | | |
|---|---|---|
| 2012/0097741 A1 | 4/2012 | Karcher |
| 2013/0033746 A1 | 2/2013 | Brumfield |
| 2014/0130395 A1* | 5/2014 | Scroggins ................. F41G 1/38 42/122 |
| 2016/0061567 A1 | 3/2016 | Regan et al. |

* cited by examiner

SYSTEM AND METHOD FOR INTRODUCING DISPLAY IMAGE INTO AFOCAL OPTICS DEVICE

FIELD

The present invention relates to systems and methods for introducing images into optics devices, and more particularly, to a system and method for introducing a display image from a display device into a rifle scope or other afocal optics device through an objective lens and without using a beamsplitter.

BACKGROUND

Display devices are used to generate display images which are displayed inside afocal optics devices (e.g., rifle scopes, binoculars, spotting scopes, and rangefinders). Such optics devices broadly include an objective lens and an ocular (or eyepiece) lens in a spaced-apart relationship along an optical axis. The objectives lens gathers light, including light reflected from a target, and focuses the gathered light on a focal plane to create an optical image at an intermediate point on the optical path, and the ocular lens magnifies this optical image for a user of the optics device.

Currently most display technologies use a beamsplitter located behind the objective lens at the focal plane and on the optical axis. While a beamsplitter is a convenient solution, it suffers from several disadvantages including that it uses valuable space inside the optics device, it reduces the overall light transmission of the optical system, and it can impart a false color to the display image. Other such display technologies use optical combiners, wherein the display image is not sent through the objective lens but rather is directed from the display device to a point on the focal plane or between the focal plane and the ocular lens.

This background discussion is intended to provide information related to the present invention which is not necessarily prior art.

SUMMARY

Embodiments of the present invention solve the above-described and other problems and limitations by providing a system and method for introducing a display image from a display device into a rifle scope or other afocal optics device through an objective lens and without using a beamsplitter. As a result, the objective lens receives and focuses the display image in addition to light received from the target, and the display image appears to a user of the optics device looking through an ocular lens to be located between the objective lens and the target and on a same focal plane as the target.

In a first embodiment of the present invention, a system is provided for introducing a display image into an afocal optics device having an objective lens and an ocular lens. The system may broadly comprise a display device, a focusing lens, and first and second reflective elements. The display device may emit the display image, the focusing lens may focus the display image, and the first reflective element may redirect the display image. The second reflective element may again redirect the display image through the objective lens and onto a focal plane so that the display image appears to a user of the optics device looking through the ocular lens to be located between the objective lens and a target.

Various implementations of the first embodiment may further include any one or more of the following features. The first reflective element may be a right angle mirror or prism and may redirect the display image ninety degrees, and the second reflective element may be a right angle mirror or prism and may redirect the display image and additional ninety degrees. The second reflective element may redirect the display image through a periphery of the objective lens.

In a second embodiment of the present invention, a system is provided for introducing a display image into an afocal optics device having an objective lens and an ocular lens arranged in a spaced-apart relationship along an optical axis for viewing a target. The system may broadly comprise a display device, a focusing lens, and first and second reflective elements. The display device may emit the display image in a first direction which is parallel to the optical axis, the focusing lens may focus the display image, and the first reflective element may be in the form of a right angle mirror or prism and may redirect the display image ninety degrees in a second direction which is perpendicular to the optical axis. The second reflective element may be in the form of a right angle mirror or prism positioned near a periphery of the objective lens and may redirect the display image an additional ninety degrees in a third direction which is parallel to the optical axis and opposite the first direction such that the display image is directed through the periphery of the objective lens so that the objective lens is receiving and focusing the display image from the display device in addition to light received from a target, and so that the display image appears on a same focal plane as the light received from the target and appears to a user of the optics device looking through the ocular lens to be located between the objective lens and the target.

Various implementations of either or both of the first and/or second embodiments may further include any one or more of the following features. The afocal optics device may take the form of a rifle scope, spotting scope, binocular, laser rangefinder, telescope, microscope, or rangefinder. The display image may communicate such information as a range to the target, an inclination to the target, a wind direction, a wind velocity, an ambient temperature, or even a suggested aiming point. The display device may include LED or LCD technology. The focusing lens may include two or more lenses arranged in a spaced-apart relationship. The periphery of the objective lens may be a distance which is no more than 30% or nor more than 20% of a diameter of the lens from an edge of the lens.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a system and method for introducing a display image from a display device into a rifle scope or other afocal optics device through an objective lens and without using a beamsplitter. As a result, the objective lens receives and focuses the display image in addition to light received from the target, and the display image appears to a user of the optics device looking through an ocular lens to be located between the objective lens and the target and on a same focal plane as the target.

Figure 1:
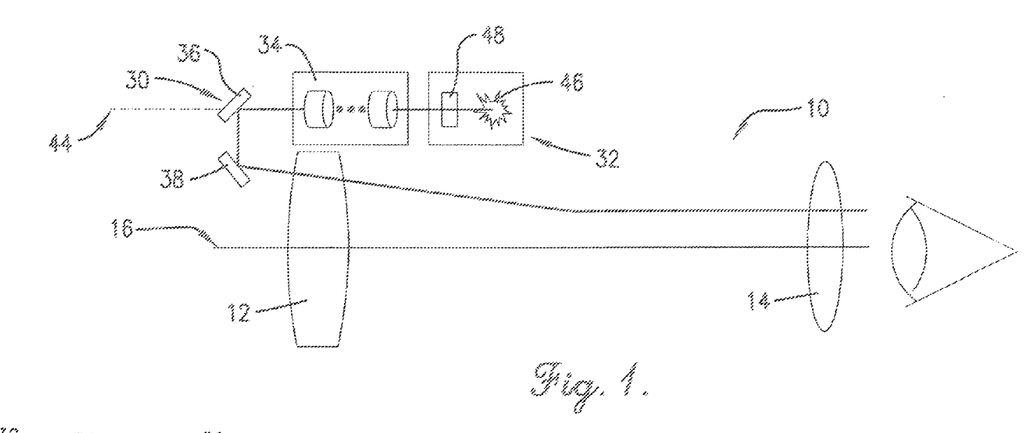
FIG. 1 is a side elevation view of an embodiment of a system constructed in accordance with the present invention for introducing a display image from a display device into an afocal optics device.

Referring to FIG. 1, an exemplary generic optics device 10 may broadly include an objective lens 12 and an ocular lens 14 in a spaced-apart relationship along an optical axis 16. The objectives lens 12 may gather light, including light reflected from a target, and focus the gathered light on a focal plane to create an optical image at an intermediate point on the optical path, and the ocular lens 14 may magnify this optical image for a user of the optics device 10. Although not shown, a variety of additional optical components may be included between the objective and ocular lenses 12,14, such as one or more additional lenses, filters, prisms, and/or mirrors depending on the nature and requirements of the particular optics device.

Figure 2:
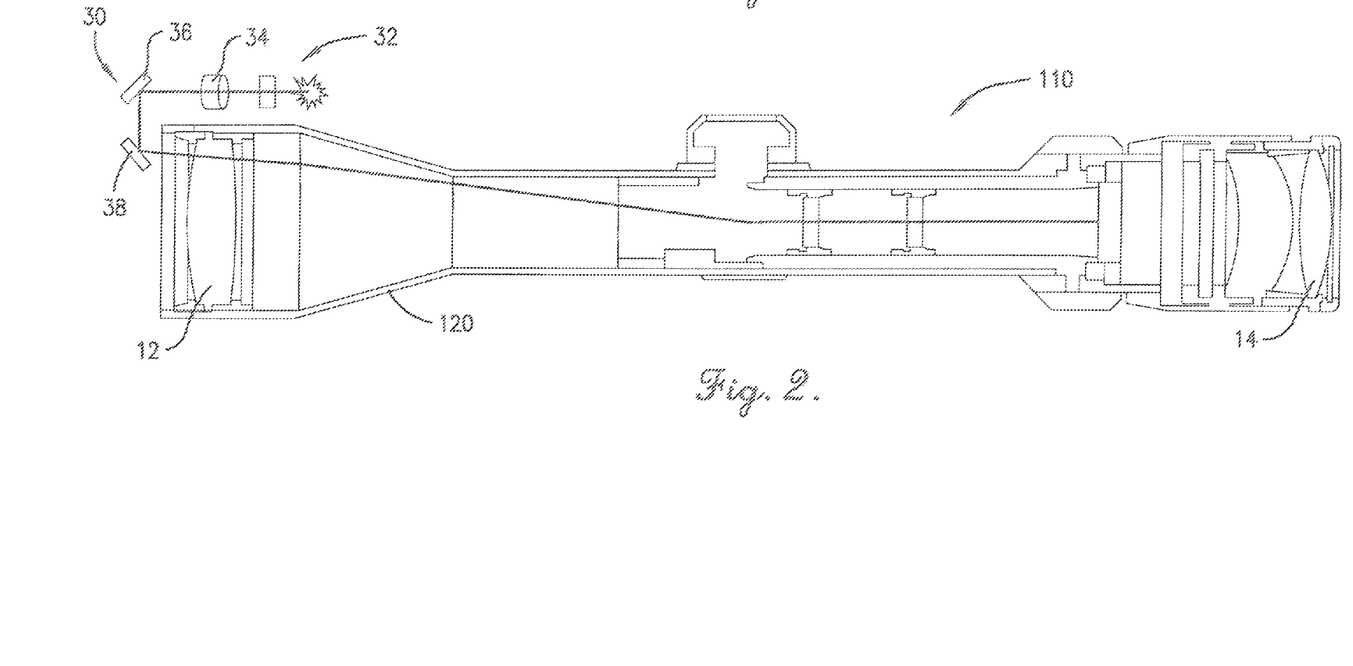
FIG. 2 is a side elevation view of the system of FIG. 1 incorporated into an exemplary rifle scope.
Figure 3:
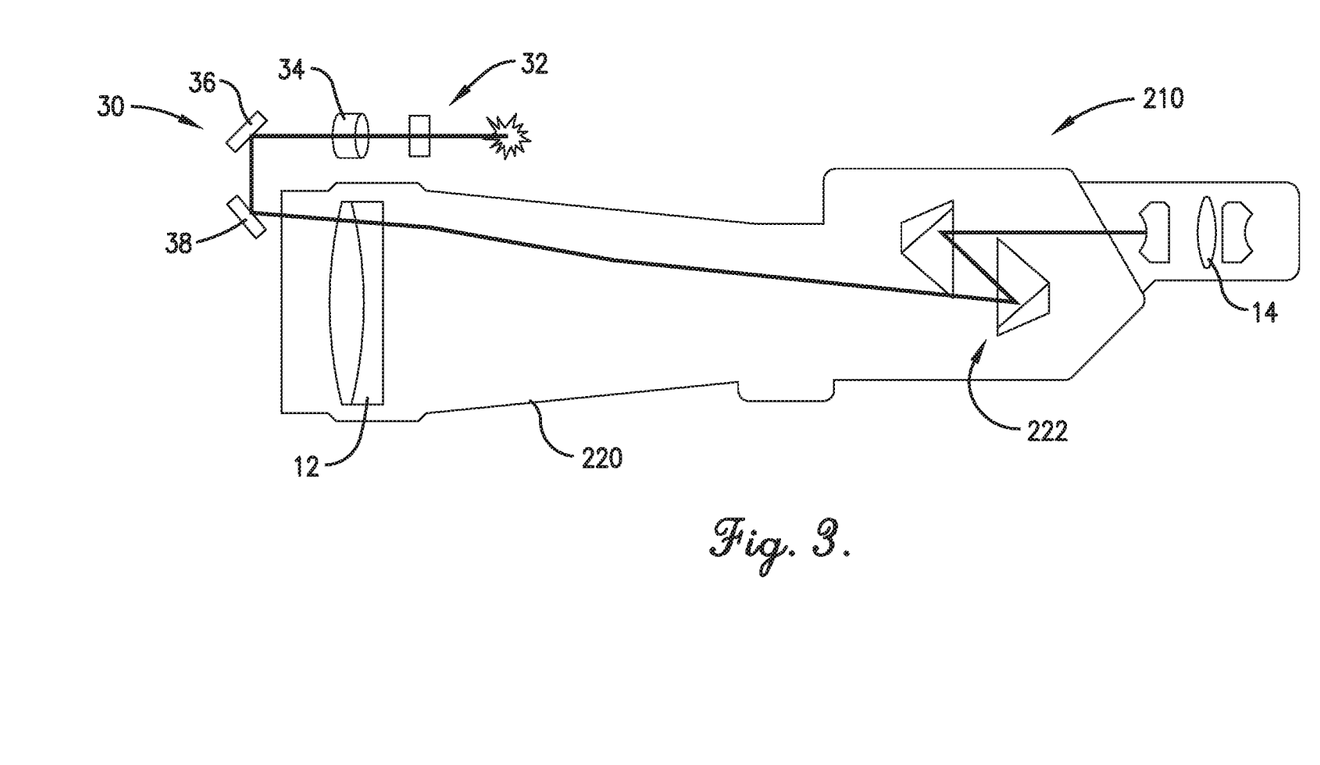
FIG. 3 is a side elevation view of the system of FIG. 1 incorporated into an exemplary spotting scope.
Figure 4:
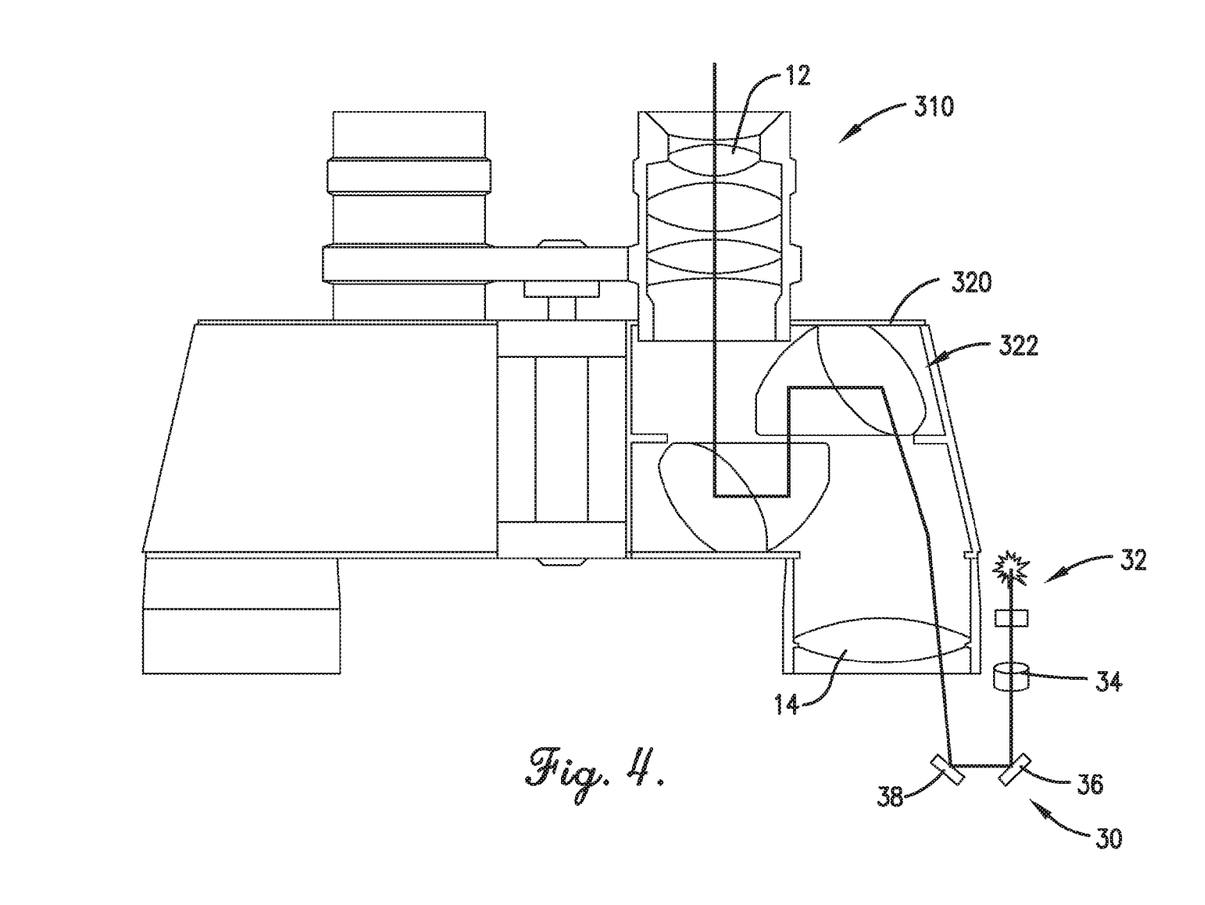
FIG. 4 is a side elevation view of the system of FIG. 1 incorporated into an exemplary binocular.

Referring also to FIG. 2, the optics device is shown as an exemplary rifle scope 110 incorporating the aforementioned components in a body 120, or tube. Other optics devices include spotting scopes, binoculars, laser rangefinders, telescopes, microscopes, or rangefinders. Referring also to FIG. 3, the optics device is shown as an exemplary spotting scope 210 incorporating the aforementioned components in a body 220 and including first and second prisms 222. Referring also to FIG. 4, the optics device is shown as an exemplary binocular 310 incorporating the aforementioned components in a body 320 and include first and second prisms 322. Other relevant optics devices include telescopes, microscopes, and rangefinders.

Figure 5:
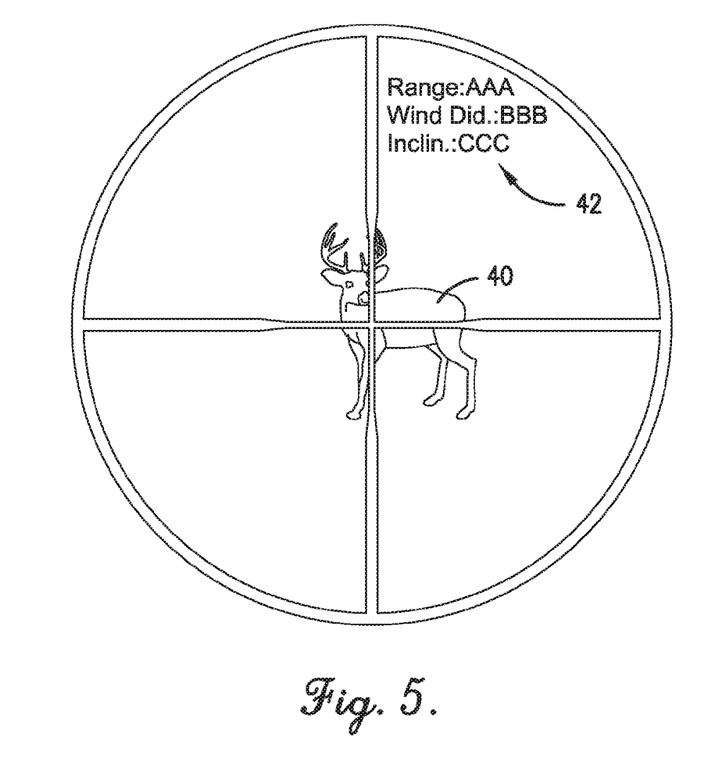
FIG. 5 is an illustration of a user's view through the system of FIG. 1.

An embodiment of a system 30 constructed in accordance with the present invention for introducing a display image into an optics device, such as the optics devices of FIGS. 1, 2, 3, and 4, may broadly comprise a display device 32, a focusing lens 34, a first reflective element 36, and a second reflective element 38. FIG. 5 illustrates a user's view through the ocular lens 14 and showing both an exemplary target 40 and an exemplary display image 42 introduced by the system 30. The display device 32, focusing lens 34, and first reflective element 36 may be in a spaced-apart relationship along a second axis 44 which is parallel to the optical axis 16.

The display device 32 may include one or more components such as an illumination source 46 and an LED or LCD display 48 which are configured to generate and emit the display 42 image in a first direction along the second axis 44 which is parallel to the optical axis 16 of the optics device. The display image may contain relevant information for the user of the optics device, which, depending on the nature of the device, may include any one or more of a range to the target 40, an inclination to the target 40, a wind direction, a wind velocity, an ambient temperature, a suggested aiming point, and/or other relevant information measured by a sensor (not shown) or inferred or calculated by an electronic processor (not shown).

The focusing lens 34 may be configured to focus the display image 42 generated by the display device 32. In one implementation, the focusing lens 34 may comprises two or more lenses arranged in a spaced-apart relationship. The first reflective element 36 may be configured to redirect the focused display image 42. In one implementation, the first reflective element 36 may be a first right angle mirror or prism configured to redirect the display image ninety degrees in a second direction which is perpendicular to the optical axis 16. It will be appreciated that if the first direction in which the display image 42 is initially emitted is not parallel with but rather is angled with respect to and intersects the optical axis 16, then the first reflective device 36 may redirect the display image 42 by more than ninety degrees in the second direction.

The second reflective element 38 may be configured to further redirect the display image 42 through the objective lens 16 so that the display image 42 appears to the user looking through the ocular lens 14 to be located between the objective lens 12 and the target 40 and on the same focal plane as the target 40. In one implementation, the second reflective element 38 may be a second right angle mirror or prism configured to redirect the display image 42 and additional ninety degrees in a third direction which is parallel to the optical axis 16 and opposite the first direction such that the display image 42 is directed through the objective lens 12 so that the objective lens 12 is receiving and focusing the display image 42 from the display device 32 in addition to light received from the target 40, and so that the display image 42 appears on the same focal plane as the target 40 and appears to a user of the optics device looking through the ocular lens 14 to be located between the objective lens 12 and the target 40.

In one implementation, the second reflective element 38 may be positioned at substantially any location in front of the objective lens 12. In another implementation, the second reflective element 38 may be positioned near a periphery of the objective lens 12, and may redirect the display image 42 through the edge or periphery of the objective lens 12, wherein "periphery" may be defined as a distance which is no more than 30% or no more than 20% of the diameter of the objective lens 12 from the edge of the objective lens 12.

Figure 6:
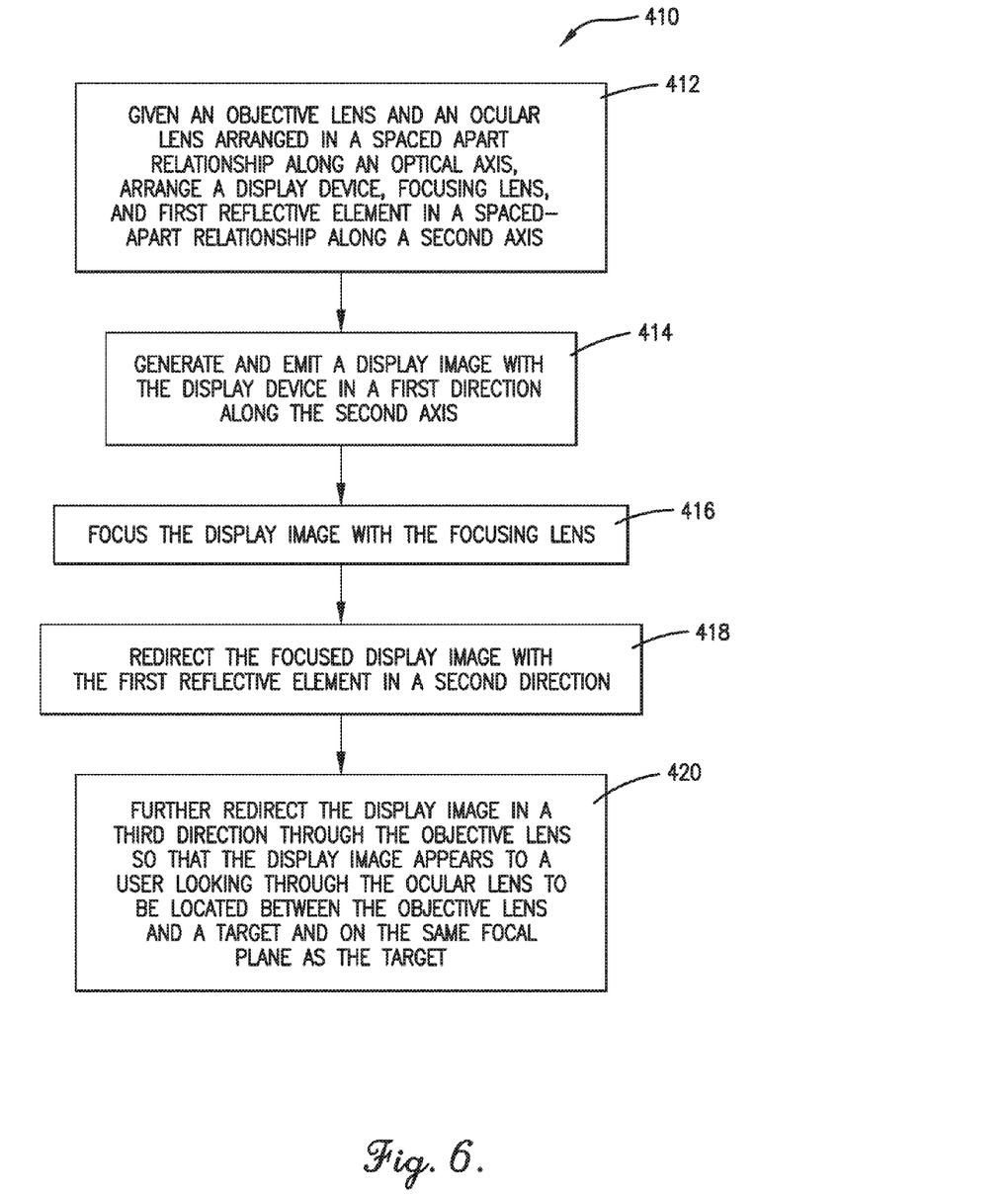
FIG. 6 is a flowchart of an embodiment of a method practiced in accordance with the present invention for introducing a display image from a display device into an afocal optics device, wherein the method may describe the functionality of the system of FIG. 1.

Referring to FIG. 6, an embodiment of a method 410 practiced in accordance with the present invention for introducing the display image 42 from the display device 32 into the optics device may broadly comprise the following steps which may describe the functionality of the system 30 of FIG. 1. The display device 32, focusing lens 34, and first reflective element 36 may be arranged in a spaced-apart relationship along the second axis 44 which is parallel to the optical axis 16, as shown in 412. The display device 32 may generate and emit the display image 42 in a first direction along the second axis 44 which is parallel to the optical axis 16 of the optics device, as shown in 414. The focusing lens 34 may focus the display image 42 generated by the display device 32, as shown in 416. The first reflective element 36 may redirect the focused display image 42 in a second direction, as shown in 418. The second reflective element 38 may further redirect the display image 42 in a third direction through the objective lens 12, as shown in 420, so that the display image 42 appears to the user looking through the ocular lens 14 to be located between the objective lens 12 and the target 40 and on the same focal plane as the target 40. Any one or more of the additional details discussed with regard to the system 30 may be incorporated into the method 410 as steps.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for introducing a display image into an afocal optics device having an objective lens and an ocular lens, the system comprising:
   a display device configured to emit the display image;
   a focusing lens configured to focus the display image;
   a first reflective element configured to redirect the display image; and
   a second reflective element configured to again redirect the display image through the objective lens and onto a focal plane so that the display image appears to a user of the afocal optics device looking through the ocular lens to be located between the objective lens and a target,
   wherein the second reflective element is configured to redirect the display image only through a periphery of the objective lens, and wherein the periphery of the objective lens is a distance which is no more than 30% of a diameter of the objective lens from an edge of the objective lens.

2. The system as set forth in claim 1, wherein the afocal optics device is selected from the group consisting of: rifle scopes, spotting scopes, binoculars, telescopes, microscopes, and rangefinders.

3. The system as set forth in claim 1, wherein the display device includes a light emitting diode display or a liquid crystal display.

4. The system as set forth in claim 1, wherein the focusing lens includes two or more lenses arranged in a spaced-apart relationship.

5. The system as set forth in claim 1, wherein the first reflective element is a right angle mirror or prism configured to redirect the display image ninety degrees.

6. The system as set forth in claim 5, wherein the second reflective element is a right angle mirror or prism configured to redirect the display image an additional ninety degrees.

7. The system as set forth in claim 1, wherein the periphery of the objective lens is a distance which is no more than 20% of a diameter of the objective lens from an edge of the objective lens.

8. A system for introducing a display image into an afocal optics device having an objective lens and an ocular lens arranged in a spaced-apart relationship along an optical axis for viewing a target, the system comprising:
   a display device configured to emit the display image in a first direction which is parallel to the optical axis;
   a focusing lens configured to focus the display image;
   a first reflective element in the form of a right angle mirror or prism configured to redirect the display image ninety degrees in a second direction which is perpendicular to the optical axis; and
   a second reflective element in the form of a right angle mirror or prism positioned near a periphery of the objective lens and configured to redirect the display image an additional ninety degrees in a third direction which is parallel to the optical axis and opposite the first direction such that the display image is directed only through the periphery of the objective lens, wherein the periphery of the objective lens is a distance which is no more than 30% of a diameter of the objective lens from an edge of the objective lens, so that the objective lens is receiving and focusing the display image from the display device in addition to light received from a target, and so that the display image appears on a same focal plane as the light received from the target and appears to a user of the afocal optics device looking through the ocular lens to be located between the objective lens and the target.

9. The system as set forth in claim 8, wherein the afocal optics device is selected from the group consisting of: rifle scopes, spotting scopes, binoculars, telescopes, microscopes, and rangefinders.

10. The system as set forth in claim 9, wherein the display image communicates information selected from the group consisting of: a range to the target, an inclination to the target, a wind direction, a wind velocity, an ambient temperature, and a suggested aiming point.

11. The system as set forth in claim 8, wherein the display device includes a light emitting diode display or a liquid crystal display.

12. The system as set forth in claim 8, wherein the focusing lens includes two or more lenses arranged in a spaced-apart relationship along the first direction.

13. The system as set forth in claim 8, wherein the periphery of the objective lens is a distance which is no more than 20% of a diameter of the objective lens from an edge of the objective lens.

14. A rifle scope comprising:
   an elongated body having a first end and a second end;
   an objective lens located at the first end and configured to gather light, including light reflected from a target, and to focus a resulting optical image on a focal plane;
   an ocular lens for magnifying the resulting optical image appearing on the focal plane,
   wherein the objective lens and the ocular lens are arranged in a spaced-apart relationship along an optical axis extending through the elongated body; and a system for introducing a display image, the system including—
   a display device configured to emit a display image in a first direction which is parallel to the optical axis,
   a focusing lens configured to focus the display image,
   a first reflective element in the form of a right angle mirror or prism configured to redirect the display image ninety degrees in a second direction which is perpendicular to the optical axis, and
   a second reflective element in the form of a right angle mirror or prism positioned near a periphery of the objective lens and configured to redirect the display image an additional ninety degrees in a third direction which is parallel to the optical axis and opposite the first direction such that the display image is directed only through the periphery of the objective lens, wherein the periphery of the objective lens is a distance which is no more than 30% of a diameter of the objective lens from an edge of the objective lens, so that the objective lens is receiving and focusing the display image from the display device in addition to light received from a target, and so that the display image appears on a same focal plane as the resulting optical image and appears to a user of the rifle scope looking through the ocular lens to be located between the objective lens and the target.

15. The rifle scope as set forth in claim 14, wherein the periphery of the objective lens is a distance which is no more than 20% of a diameter of the objective lens from an edge of the objective lens.

16. The rifle scope as set forth in claim 14, wherein the display image communicates information selected from the group consisting of: a range to the target, an inclination to the target, a wind direction, a wind velocity, an ambient temperature, and a suggested aiming point.

* * * * *